(12) United States Patent
Maripudi

(10) Patent No.: US 7,494,151 B2
(45) Date of Patent: Feb. 24, 2009

(54) AIRBAG APPARATUS WITH ADAPTIVE INFLATION

(75) Inventor: Vivekananda S. Maripudi, Rochester Hills, MI (US)

(73) Assignee: TK Holdings Inc., Auburn Hills, MI (US)

( * ) Notice: Subject to any disclaimer, the term of this patent is extended or adjusted under 35 U.S.C. 154(b) by 335 days.

(21) Appl. No.: 11/059,329

(22) Filed: Feb. 17, 2005

(65) Prior Publication Data

US 2006/0181067 A1 Aug. 17, 2006

(51) Int. Cl.
*B60R 21/239* (2006.01)

(52) U.S. Cl. ..................................... 280/739
(58) Field of Classification Search ................. 280/739, 280/742
See application file for complete search history.

(56) References Cited

U.S. PATENT DOCUMENTS

| | | | |
|---|---|---|---|
| 5,217,249 A | 6/1993 | Kokeguchi | |
| 5,280,953 A | 1/1994 | Wolanin et al. | |
| 5,366,242 A | 11/1994 | Faigle et al. | |
| 5,388,860 A | 2/1995 | Brede et al. | |
| 5,513,879 A | 5/1996 | Patel et al. | |
| 5,524,925 A | 6/1996 | Rose et al. | |
| 5,536,038 A | 7/1996 | Bollaert et al. | |
| 5,564,738 A | 10/1996 | Johnson | |
| 5,645,297 A | 7/1997 | Rose et al. | |
| 5,669,628 A | 9/1997 | Kaufmann et al. | |
| 5,683,102 A | 11/1997 | Davis et al. | |
| 5,707,078 A | 1/1998 | Swanberg et al. | |
| 5,709,405 A | 1/1998 | Saderholm et al. | |
| 5,931,497 A * | 8/1999 | Fischer | 280/743.1 |
| 6,082,765 A | 7/2000 | Bowers et al. | |
| 6,095,557 A | 8/2000 | Takimoto et al. | |
| 6,161,866 A | 12/2000 | Ryan et al. | |
| 6,199,895 B1 | 3/2001 | Seymour | |
| 6,224,101 B1 * | 5/2001 | Nishijima et al. | 280/743.2 |
| 6,371,517 B1 | 4/2002 | Webber et al. | |
| 6,439,603 B2 | 8/2002 | Damman et al. | |
| 6,439,605 B2 | 8/2002 | Ariyoshi | |
| 6,550,807 B1 | 4/2003 | Faigle et al. | |
| 6,588,795 B2 | 7/2003 | Fischer et al. | |
| 6,669,231 B2 | 12/2003 | Ryan | |
| 6,692,021 B2 | 2/2004 | Amamori | |
| 6,746,044 B2 | 6/2004 | Elqadah et al. | |
| 6,773,030 B2 * | 8/2004 | Fischer | 280/739 |
| 6,991,258 B2 * | 1/2006 | Hawthorn et al. | 280/742 |
| 2002/0041090 A1 | 4/2002 | Wohllebe et al. | |
| 2003/0155756 A1 * | 8/2003 | Hawthorn et al. | 280/739 |
| 2004/0094940 A1 | 5/2004 | Hawthorn et al. | |
| 2004/0113406 A1 | 6/2004 | Elqadah et al. | |
| 2004/0155442 A1 | 8/2004 | Ford et al. | |
| 2004/0188990 A1 | 9/2004 | Short et al. | |
| 2005/0040634 A1 * | 2/2005 | Braun et al. | 280/742 |
| 2005/0104347 A1 * | 5/2005 | Hawthorn et al. | 280/739 |
| 2005/0248137 A1 * | 11/2005 | Delventhal et al. | 280/739 |

* cited by examiner

*Primary Examiner*—Eric Culbreth
(74) *Attorney, Agent, or Firm*—Foley & Lardner LLP

(57) ABSTRACT

An airbag apparatus with adaptive inflation characteristics vents inflation gas prior to full airbag deployment to afford proper protection for an out-of-position occupant. A vent opening in the casing is controlled by a movable control section of the airbag itself. The control section has a control opening that is registered with the vent opening when the airbag is uninflated, or when it is partially inflated, such as when the airbag encounters an out-of-position occupant. For a properly positioned occupant, the control section moves to cover the vent opening as the airbag becomes fully inflated to block the escape of gas from the casing.

19 Claims, 4 Drawing Sheets

[Time = 0ms]

[Time = 13ms]

[Time = 18ms]

US 7,494,151 B2

AIRBAG APPARATUS WITH ADAPTIVE INFLATION

BACKGROUND

The present invention relates to an airbag device for protection of a vehicle occupant and, more particularly, to an airbag that is inflatable in front of a vehicle occupant.

Airbags are employed in various locations in vehicles as secondary restraint mechanisms to operate in conjunction with seat belts in order to provide enhanced protection for vehicle occupants during an impact event. A front impact airbag typically is designed to inflate over a 15-40 millisecond time frame, and to deflate in a controlled manner as the occupant moves forwardly against the inflated airbag to absorb kinetic energy.

Some front airbags are designed to inflate partially in the case of an out-of-position occupant, such as an occupant who at the time of the impact event is leaning forwardly, or in other situations where the occupant is too close to the airbag module for proper airbag deployment. Such arrangements are intended to reduce the inflation force so that the closely positioned occupant is not injured by the expanding airbag. Examples of such devices are mentioned briefly below.

U.S. Pat. Nos. 5,709,405, 6,161,866, 6,199,895 and 6,746,044 disclose airbag devices in which an electronic control system operates a mechanical vent valve. Valve actuation is governed by an occupant position sensor. When an out-of-position occupant condition is detected, a portion of the inflation gas is vented from the casing of the device to moderate the degree of airbag inflation.

U.S. Pat. No. 5,280,953 discloses an airbag having side vents that are progressively closed by a tether-actuated sliding flap as the airbag inflates. The degree of vent closure depends on the displacement of the airbag toward the fully deployed position.

US patent publication No. US 2004/0188990 A1 discloses various tether-actuated valve arrangements that close a gas vent channel in the airbag module casing as the airbag approaches the fully deployed position.

SUMMARY

The present invention provides a front airbag apparatus of simplified construction that provides for venting of inflation gas prior to full airbag deployment to afford proper protection for an occupant who is out of position, or otherwise is too close to the apparatus.

An airbag apparatus of the present invention comprises a casing having walls defining a chamber, the chamber having an inner end and an opposite airbag deployment end. An airbag is folded within and is attached to the casing. The airbag has a front face adapted to contact and cushion a vehicle occupant and a control section. A gas generator provides gas to the chamber to inflate the airbag. One wall of the casing has at least one vent opening through which a portion of the gas can escape from the chamber. A first portion of the control section extends along the one wall and has a control opening registered with the vent opening when the airbag is uninflated or partially inflated such that gas can escape from the casing through the registered openings. The first portion of the control section moves over the one wall as the airbag becomes fully inflated to move the control opening out of registry with the vent opening so that the control section covers the vent opening to substantially block the escape of gas therethrough.

In a preferred embodiment the vent opening is in a side wall of the casing; and the control section of the airbag has a second portion that is folded when the airbag is uninflated or partially inflated, and unfolds as the airbag becomes fully inflated to allow the first portion to move over the side wall.

BRIEF DESCRIPTION OF THE DRAWINGS

These and other features, aspects, and advantages of the present invention will become apparent from the following description, appended claims, and the accompanying exemplary embodiments shown in the drawings, which are briefly described below.

FIG. 1 is a schematic longitudinal cross-sectional view of the airbag apparatus prior to an impact event that triggers the release of inflation gas.

FIG. 2 is a view similar to FIG. 1, showing the airbag partially inflated and just making contact with an out-of-position occupant.

FIG. 3 is a view similar to FIG. 2, showing the airbag further inflated.

FIG. 4 is identical to FIG. 1.

FIG. 5 is a view similar to FIG. 4, showing the airbag partially inflated.

FIG. 6 is a view similar to FIG. 5, showing the airbag fully inflated.

DETAILED DESCRIPTION

Figure 1:
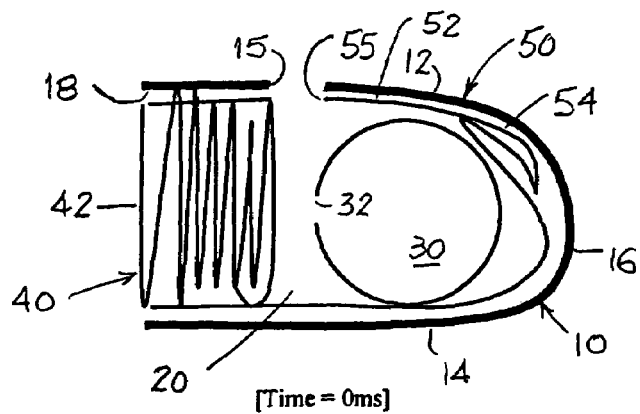
FIGS. 1-3 sequentially illustrate the operation of an airbag apparatus according to the invention to cushion an out-of-position occupant.

FIG. 1 illustrates the basic components of one example of an airbag apparatus according to the invention. This example is tailored for installation in the vehicle instrument panel. However, those skilled in the art will appreciate that the apparatus can be adapted for use in front of any seating position in the vehicle.

Casing 10 defines a chamber 20 that houses a gas generator 30 and a folded airbag 40. Casing 10 has side walls 12, 14, an end wall 16 at the inner end of the chamber, and an opening 18 at the opposite deployment end of the chamber. Opening 18 is closed by a conventional cover (not shown) that opens to permit the airbag to deploy as it inflates. Side wall 12 has at least one vent opening 15, the purpose of which is described below.

Gas generator 30 may be of any known type that generates inflation gas when triggered by an impact event, such as a frontal collision of the vehicle. The gas generator has at least one gas outlet 32 through which inflation gas is delivered to chamber 20. Although gas generator 30 is shown disposed within the chamber, it could be located outside chamber 20 and deliver inflation gas to the chamber through a conduit.

Airbag 40 can be made of any fabric that is conventionally used for airbags, and is folded near the deployment end of chamber 20 so that it can freely expand into the passenger compartment of the vehicle when filled with inflation gas. The airbag is attached to the casing, preferably at the inner end of the casing by any suitable means, such as a retaining strap 44 (see FIG. 7) with bolts or rivets (not shown) that pass through holes 46 and are anchored to the casing. The airbag may also wrap around the gas generator 30, as shown in FIG. 1. The airbag has a front face 42 adapted to contact and cushion a vehicle occupant P (see FIG. 2) when the airbag is inflated. The airbag also has deflation vents of any known type (not shown) that allow the escape of gas after inflation to effect controlled dissipation of impact energy.

Figure 2:
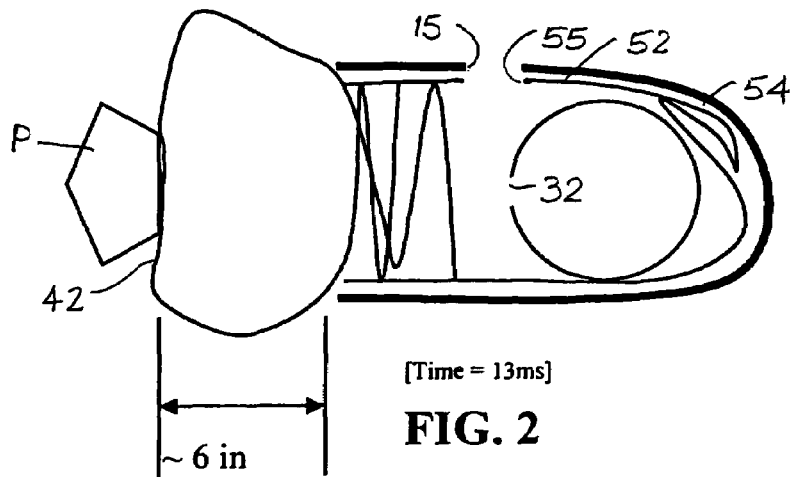
Figure 3:
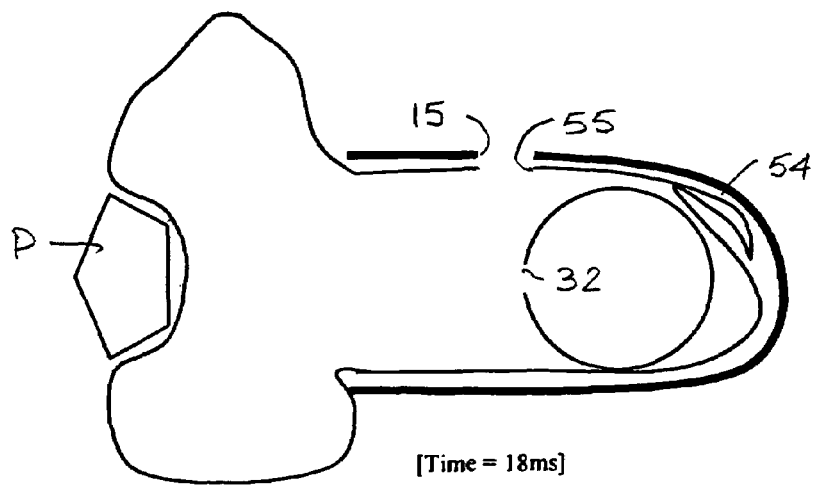
Figure 4:
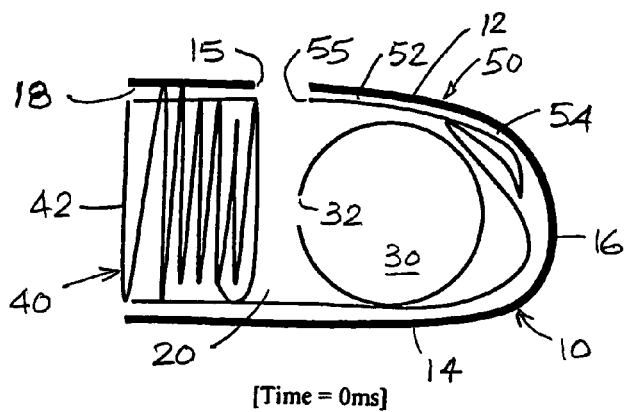
FIGS. 4-6 sequentially illustrate the operation of an airbag apparatus according to the invention to cushion a properly positioned occupant.
Figure 5:
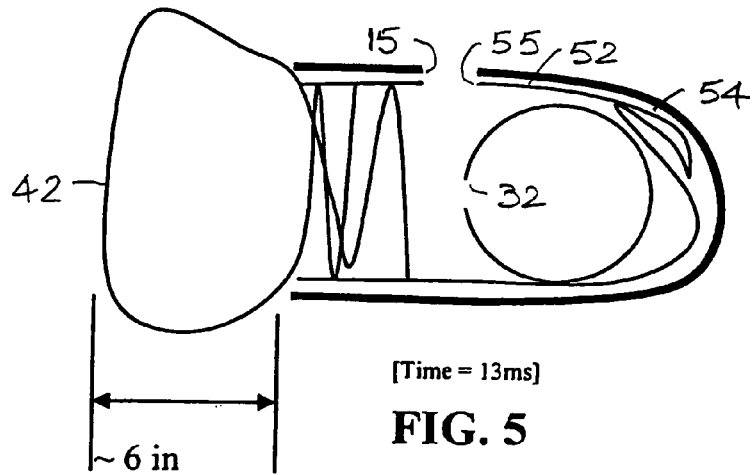
Figure 6:
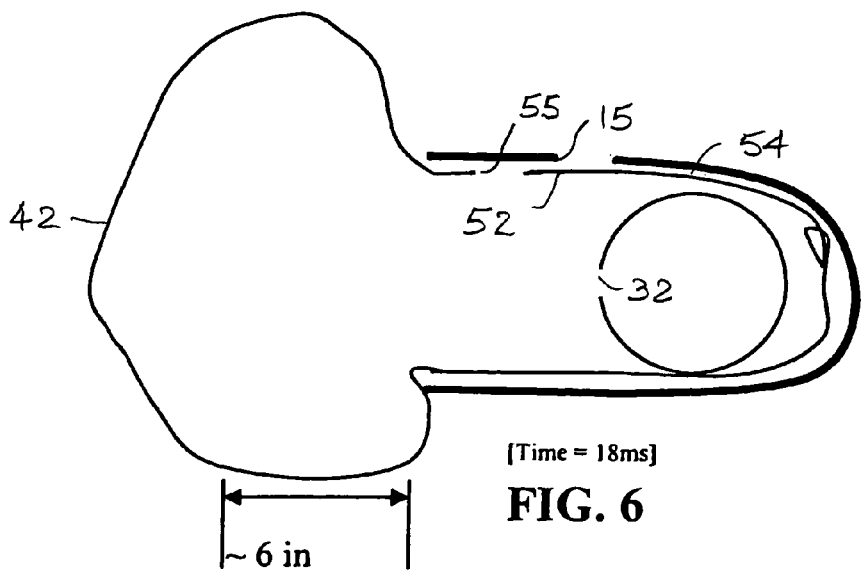

Airbag 40 has a control section 50, preferably made of the same fabric as the rest of the airbag, and/or made of stiff material (metal or plastic) to retain the folded airbag that extends along side wall 12. A first portion 52 of control section 50 has a control opening 55 that is initially registered with vent opening 15 in side wall 12, i.e., when the airbag is uninflated (FIGS. 1, 4) or partially inflated (FIGS. 2, 3, 5). A second portion 54 of control section 50 is folded on itself near the inner end of the chamber. A retainer (FIG. 7, described below) is designed to keep the second portion 54 in folded condition when the airbag is uninflated (FIGS. 1, 4) or partially inflated (FIGS. 2, 3, 5), but release the fold as the airbag becomes fully inflated (FIG. 6).

Referring to FIGS. 1-3, the operation of the airbag apparatus according to the invention will first be described with reference to an out-of-position occupant P. FIG. 1 shows the condition of the apparatus at the moment (0 ms) an impact event triggers the release of inflation gas from gas generator 30. A portion of the gas escapes through the registered vent and control openings 15, 55, but the airbag 40 will begin to inflate as it fills with gas. FIG. 2 shows the condition at approximately 13 ms after the impact event, when the front face 42 of the airbag contacts the occupant P, who is located as close as about 6 inches from the deployment end of the casing. The airbag will continue to deploy, but the obstacle presented by the occupant prevents it from inflating fully. See FIG. 3, which shows the condition at approximately 18 ms after the impact event, when the inflation gas source (30) is spent. Here, the airbag has begun to envelop the occupant, but there is insufficient force on the control section 50 of the airbag to cause the second portion 54 to unfold. As a result, the vent and control openings 15, 55 remain in registry, allowing gas to continue to escape from the chamber. The effect is a less forceful inflation of the airbag, which lessens the chance of inflation-related injury for the out-of-position occupant.

The situation with a properly positioned occupant is described with reference to FIGS. 4-6. FIG. 4, like FIG. 1, shows the condition of the apparatus at the moment (0 ms) an impact event triggers the release of inflation gas from gas generator 30. A portion of the gas escapes through the registered vent and control openings 15, 55, but the airbag 40 will begin to inflate as it fills with gas. FIG. 5 shows the condition at approximately 13 ms after the impact event. This is similar to the condition shown in FIG. 2, but the occupant (not shown), being properly positioned, does not present an obstacle to the expanding airbag. Accordingly, the airbag will continue to expand towards its fully inflated condition (18 ms, FIG. 6). As it does so the force on the airbag pulls control section 50 so that the second portion 54 unfolds. This allows the first portion 52 to move over side wall 12, and move control opening 55 out of registry with vent opening 15. The imperforate portion of the control section thus covers the vent opening 15 and is pressed against the side wall 12 by gas pressure to substantially block the escape of gas from the chamber through vent opening 15. In this condition the fully inflated airbag affords maximum protection for the properly positioned occupant as deflation occurs through the normal airbag deflation vents (not shown).

Figure 7:
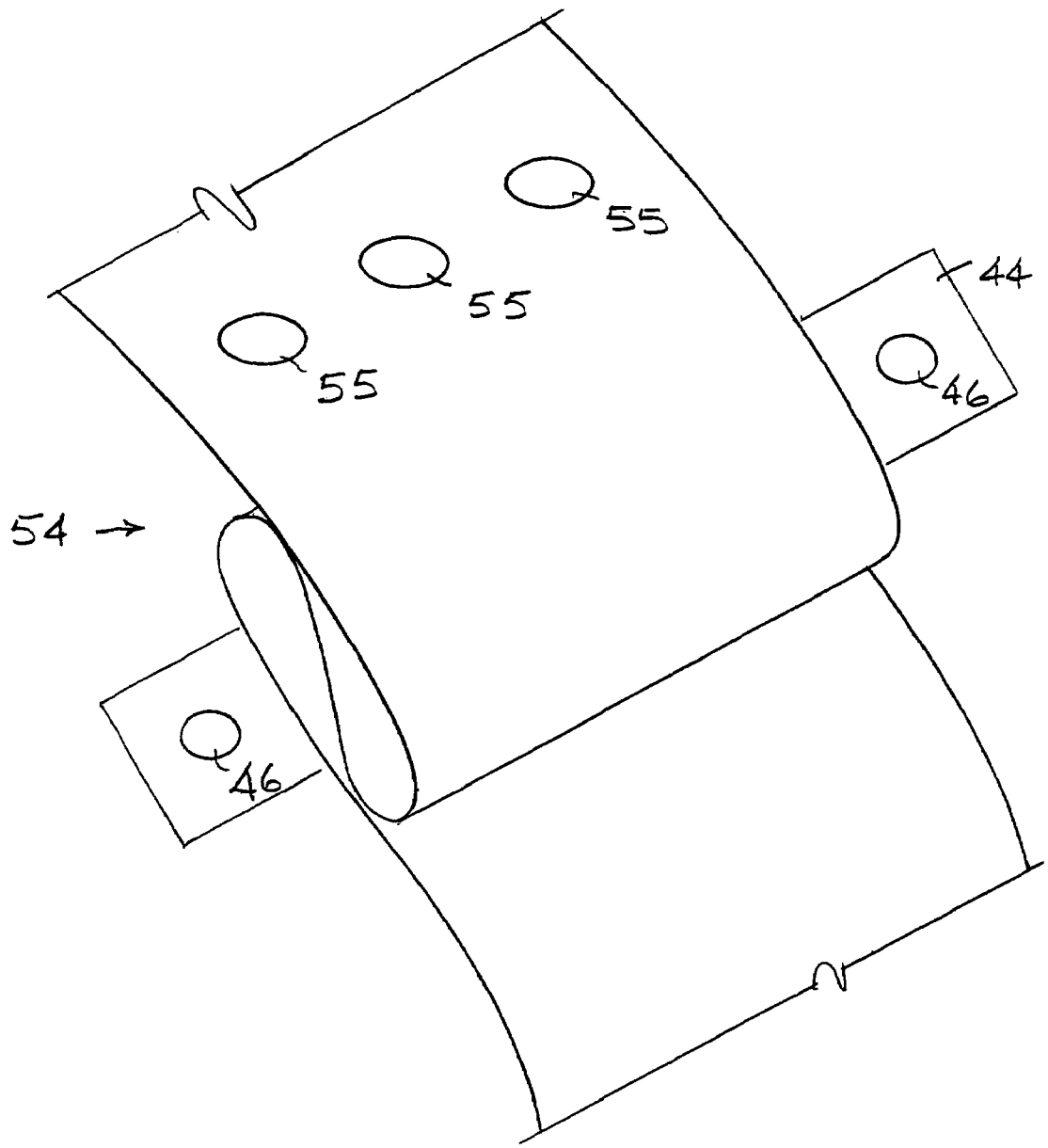
FIG. 7 is a schematic perspective view of a folded portion of the control section of the airbag according to the invention, retained by a strap.
Figure 8:
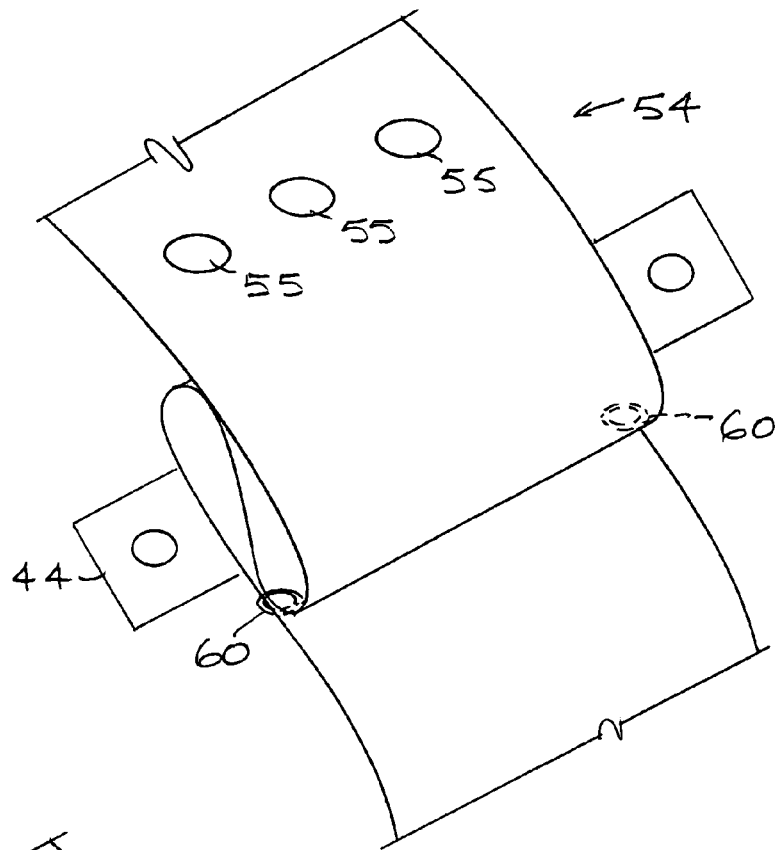
FIG. 8 is a view similar to FIG. 7, showing the folded portion, retained by a strap and/or O-rings.
Figure 9:
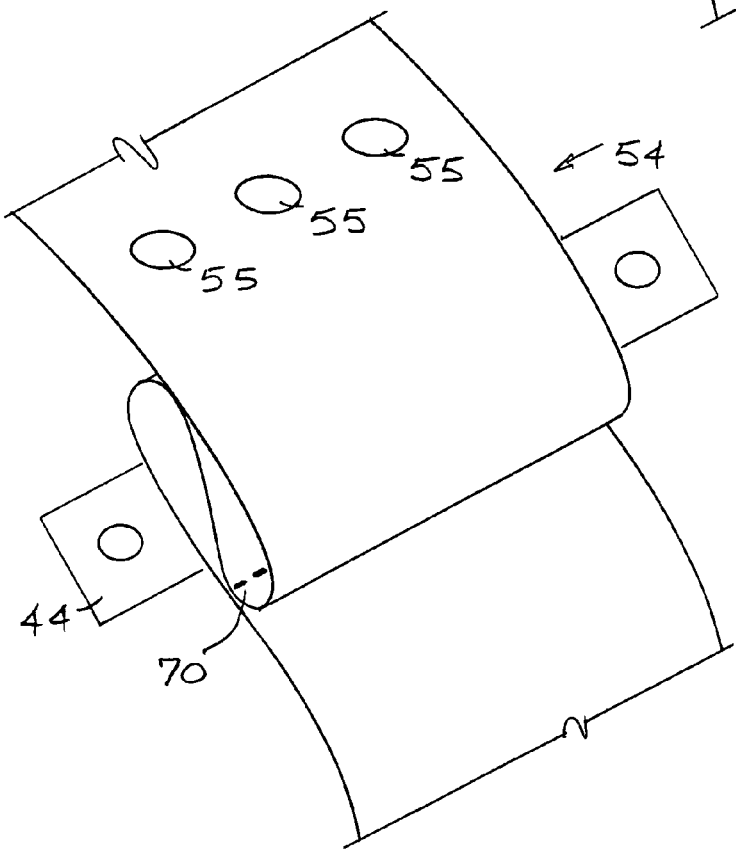
FIG. 9 is a view similar to FIG. 7, showing the folded portion, retained by a strap and/or tacking.

FIGS. 7-9 show examples of how the second portion 54 of the control section 50 is releasably retained in a folded condition (the sides of the airbag have been omitted for the sake of clarity). Other examples will be apparent to those skilled in the art. These figures also show that a plurality of control openings 55 may be provided for registry with a like plurality of vent openings (not shown) in side wall 12. In the example shown, there are three collinear control openings 55.

Referring to FIG. 7, the retaining strap 44 that attaches the airbag to the casing may also be used to cinch the second portion 54 in its folded condition. The retaining strap maintains the folded condition until the inflation force overcomes the frictional force between the strap 44 and the airbag material, whereupon the second portion will unfold and pay out to close the vent opening(s) 15.

Referring to FIG. 8, the retaining strap may be supplemented or replaced by frangible O-rings 60 at the sides of the airbag that maintain the fold, but are designed to break when the inflation force on the airbag fabric exceeds a predetermined threshold value.

Referring to FIG. 9, the retaining strap may be supplemented or replaced by releasable stitching (tacking) 70 that is placed at the sides of the airbag, or extends partly or completely across the width of the airbag. This tacking maintains the fold but yields when the inflation force on the airbag fabric exceeds a predetermined threshold value.

The invention thus provides a simple, economical and reliable arrangement for automatically adjusting airbag inflation depending on the position of the occupant, without the need for position sensors, mechanical valves and actuators, and electronic controls.

Given the disclosure of the present invention, one versed in the art would appreciate that there are other embodiments and modifications within the scope of the invention. Accordingly, all modifications attainable by one versed in the art from the present disclosure are within the scope of the present invention and are to be included as further embodiments of the present invention. The scope of the present invention is to be defined as set forth in the following claims.

What is claimed is:

1. An airbag apparatus comprising:
   a casing having walls defining a chamber, the chamber having an inner end and an opposite airbag deployment end;
   an airbag folded within and attached to the casing, the airbag including an interior inflatable chamber, wherein a boundary wall of the inflatable chamber includes a front face adapted to contact and cushion a vehicle occupant and a control section integrally connected to the front face;
   a gas generator for providing gas to the chamber to inflate the airbag; and
   at least one vent opening in one wall of the casing through which a portion of the gas can escape from the chamber, wherein a first portion of the control section extends along said one wall and has a control opening registered with the vent opening when the airbag is uninflated or partially inflated such that gas can escape from the casing through the registered openings, and wherein the first portion of the control section moves over said one wall as the airbag becomes fully inflated to move the control opening out of registry with the vent opening so that the control section covers the vent opening to substantially block the escape of gas therethrough.

2. An airbag apparatus according to claim 1, comprising a plurality of vent openings in said one wall and a like plurality of control openings in the first portion of the control section, each of the control openings being registered with a respective vent opening when the airbag is uninflated or partially inflated, and all of the control openings being movable in unison out of registry with the vent openings as the airbag becomes fully inflated.

3. An airbag apparatus according to claim 2, wherein the vent openings are formed in a side wall of the casing.

4. An airbag apparatus according to claim 2, wherein all of the vent openings are collinear.

5. An airbag apparatus according to claim 1, wherein the vent opening is formed in a side wall of the casing.

6. An airbag apparatus according to claim 1, wherein the first portion begins to move over said one wall when the front face has moved outwardly about 6 inches from the deployment end of the casing.

7. An airbag apparatus according to claim 6, wherein the vent opening is formed in a side wall of the casing.

8. An airbag apparatus according to claim 1, wherein a portion of the airbag is configured to wrap around the gas generator, such that the airbag encircles the gas generator.

9. An airbag apparatus comprising:
  a casing having walls defining a chamber, the chamber having an inner end and an opposite airbag deployment end;
  an airbag folded within and attached to the casing near the inner end, the airbag including an interior inflatable chamber, wherein a boundary wall of the inflatable chamber includes a front face adapted to contact and cushion a vehicle occupant and a single control section integrally connected to the front face;
  a gas generator for providing gas to the chamber to inflate the airbag; and
  at least one vent opening in a side wall of the casing through which a portion of the gas can escape from the chamber,
  wherein a first portion of the control section extends along said side wall and has a control opening registered with the vent opening when the airbag is uninflated or partially inflated such that gas can escape from the casing through the registered openings; and
  wherein a second portion of the control section is folded when the airbag is uninflated or partially inflated, and unfolds as the airbag becomes fully inflated to allow the first portion of the control section to move over said side wall and move the control opening out of registry with the vent opening so that the control section covers the vent opening to substantially block the escape of gas therethrough, the single control section being the only portion of the airbag with control openings to align with the vent opening in the casing to allow venting of gas through the registered openings.

10. An airbag apparatus according to claim 9, comprising a plurality of vent openings in said side wall and a like plurality of control openings in the first portion of the control section, each of the control openings being registered with a respective vent opening when the airbag is uninflated or partially inflated, and all of the control openings being movable in unison out of registry with the vent openings as the airbag becomes fully inflated.

11. An airbag apparatus according to claim 10, wherein all of the vent openings are collinear.

12. An airbag apparatus according to claim 9, comprising a releasable retainer that keeps the second portion folded when the airbag is uninflated or partially inflated, and allows the second portion to unfold as the airbag becomes fully inflated.

13. An airbag apparatus according to claim 12, wherein the releasable retainer comprises a strap.

14. An airbag apparatus according to claim 13, wherein the strap holds the second portion folded against a wall of the casing.

15. An airbag apparatus according to claim 12, wherein the releasable retainer comprises releasable elements holding at least one fold of the second portion together.

16. An airbag apparatus according to claim 15, wherein the releasable elements comprise frangible rings.

17. An airbag apparatus according to claim 15, wherein the releasable elements comprise tacking.

18. An airbag apparatus according to claim 9, wherein the second portion begins to unfold when the front face has moved outwardly about 6 inches from the deployment end of the casing.

19. An airbag apparatus according to claim 9, wherein the second portion is disposed near the inner end of the casing.

* * * * *